United States Patent
Manninen

(10) Patent No.: US 8,240,673 B2
(45) Date of Patent: Aug. 14, 2012

(54) FLOW MACHINE, SLIDE RING SEAL THEREOF, BODY PART FOR SAID SLIDE RING SEAL AND METHOD OF FASTENING SAID SLIDE RING SEAL TO SAID FLOW MACHINE

(75) Inventor: Heikki Manninen, Vilppula (FI)

(73) Assignee: Sulzer Pumpen AG, Winterthur (CH)

( * ) Notice: Subject to any disclaimer, the term of this patent is extended or adjusted under 35 U.S.C. 154(b) by 427 days.

(21) Appl. No.: 11/413,602

(22) Filed: Apr. 28, 2006

(65) Prior Publication Data

US 2006/0263207 A1 Nov. 23, 2006

(30) Foreign Application Priority Data

Apr. 29, 2005 (FI) ..................................... 20050452

(51) Int. Cl.
*F16J 15/34* (2006.01)

(52) U.S. Cl. ......... 277/370; 277/371; 277/375; 277/386

(58) Field of Classification Search .................. 277/370, 277/371, 375, 386; 403/362; 411/393
See application file for complete search history.

(56) References Cited

U.S. PATENT DOCUMENTS

| | | | | |
|---|---|---|---|---|
| 1,831,856 A * | 11/1931 | Fullman | ........................ | 285/404 |
| 1,910,563 A * | 5/1933 | Porter | ............................ | 403/300 |
| 1,940,455 A * | 12/1933 | Kilpela | ........................... | 403/230 |
| 1,977,343 A * | 10/1934 | Matthes | ....................... | 191/44.1 |
| 2,472,257 A * | 6/1949 | Matter | ........................... | 277/386 |
| 2,614,874 A * | 10/1952 | Helfrecht | ....................... | 277/372 |
| RE23,898 E * | 11/1954 | Haake | ............................ | 277/393 |
| 2,769,390 A * | 11/1956 | Heimbuch | ..................... | 415/111 |
| 2,935,896 A * | 5/1960 | Simon | .............................. | 74/553 |
| 3,397,894 A * | 8/1968 | Mastriforte et al. | .......... | 277/391 |
| 3,526,408 A * | 9/1970 | Tracy | ............................. | 277/379 |
| 3,582,089 A * | 6/1971 | Amorese | ....................... | 277/364 |
| 3,594,102 A * | 7/1971 | Oden | ....................... | 417/423.11 |
| 4,294,453 A * | 10/1981 | Inouye et al. | ................. | 277/348 |
| 4,332,391 A | 6/1982 | Arnold et al. | | |
| 4,367,979 A * | 1/1983 | Milligan | ......................... | 405/70 |
| 4,403,778 A | 9/1983 | Shevokas et al. | | |

(Continued)

FOREIGN PATENT DOCUMENTS

DE 19720778 C1 10/1998

*Primary Examiner* — Alison Pickard
(74) *Attorney, Agent, or Firm* — Kilpatrick Townsend & Stockton LLP

(57) ABSTRACT

The present invention relates to a new kind of a mechanical seal, a so called slide ring seal, which is used, for example, for sealing a shaft space of a centrifugal pump in relation to a pumping space thereof. The present invention especially relates both to centering said mechanical seal and/or fastening said mechanical seal to the casing of said centrifugal pump and a body part used for the attachment. A characterizing feature of a mechanical seal in accordance with the present invention, comprising at least one rotary slide ring unit (24, 24', 24"), a body part by means of which said seal is attached to said casing (16), and at least one either separate counter ring unit (42, 42') or a counter ring unit (42, 42') stationarily attached to said body part, is that said body part (40, 40') is provided with inclined fastening means (52), by means of which the body part (40, 40') is tightened to the casing both axially and radially.

13 Claims, 2 Drawing Sheets

U.S. PATENT DOCUMENTS

Figure 1:
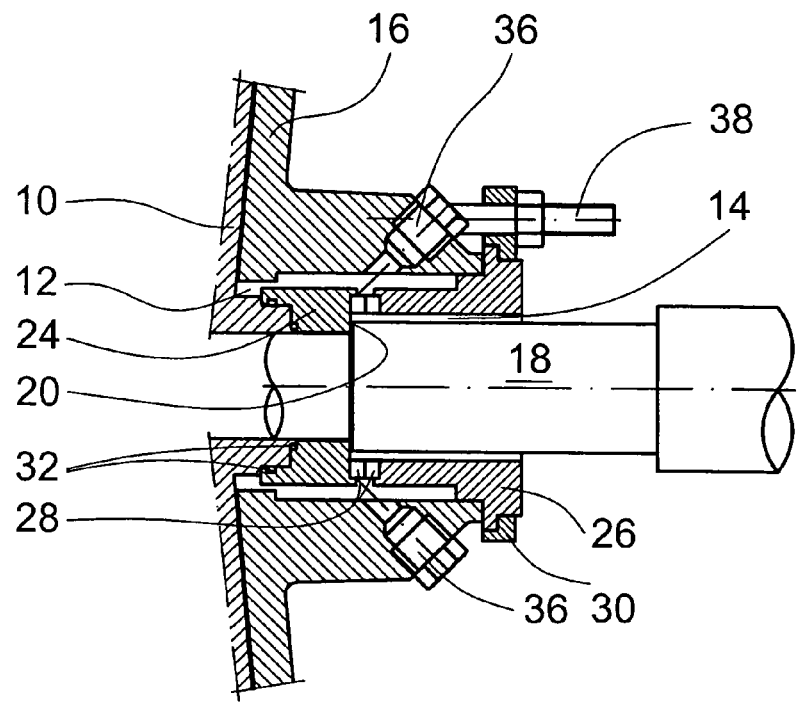

| | | | |
|---|---|---|---|
| 4,493,317 A * | 1/1985 | Klaue | 606/282 |
| 4,781,351 A * | 11/1988 | Parapetti | 248/288.11 |
| 5,020,809 A * | 6/1991 | Mullaney | 277/370 |
| 5,192,085 A * | 3/1993 | McOnie | 277/370 |
| 5,344,164 A | 9/1994 | Carmody et al. | |
| 5,732,180 A * | 3/1998 | Kaplan | 385/135 |
| 6,068,263 A * | 5/2000 | Azibert et al. | 277/370 |
| 6,152,604 A * | 11/2000 | Ostling et al. | 384/478 |
| 6,264,394 B1 * | 7/2001 | Feleppa | 403/362 |
| 6,685,191 B2 * | 2/2004 | Toal | 277/370 |
| 6,773,017 B2 * | 8/2004 | Henningson | 277/391 |
| 7,037,026 B2 * | 5/2006 | Ostling et al. | 403/371 |
| 7,237,778 B1 * | 7/2007 | Althouse, III | 277/630 |
| 7,416,224 B2 * | 8/2008 | Ott | 285/121.1 |
| 2002/0098036 A1 * | 7/2002 | Strobel et al. | 403/362 |
| 2004/0223819 A1 * | 11/2004 | Sheffler et al. | 407/108 |
| 2005/0161885 A1 * | 7/2005 | Ott | 277/370 |
| 2005/0165400 A1 * | 7/2005 | Fernandez | 606/69 |
| 2006/0061041 A1 * | 3/2006 | Huang | 277/370 |
| 2008/0234677 A1 * | 9/2008 | Dahners et al. | 606/60 |

* cited by examiner

FLOW MACHINE, SLIDE RING SEAL THEREOF, BODY PART FOR SAID SLIDE RING SEAL AND METHOD OF FASTENING SAID SLIDE RING SEAL TO SAID FLOW MACHINE

The present invention relates to a new kind of a mechanical seal, so called slide ring seal used, for example, for sealing a shaft space of a centrifugal pump in relation to a pumping space thereof. The present invention especially relates both to fastening said mechanical seal to a casing or a cover of the casing of a flow machine, the flow machine itself and a body part of said slide ring seal, and a method of fastening said slide ring seal to said flow machine.

In the following, a flow machine refers to a centrifugal pump, but it must be born in mind that the term flow machine refers in connection with the present invention to all liquid treating apparatuses having a rotary shaft, which is to be sealed in such a way that the liquid to be treated is not able to flow along the shaft out of the apparatus. The prior art introduces, for example, slide ring seals, such as in FIG. 1, in which the slide ring seal used as shaft seal of a pump is typically fastened to a pump casing or a cover of said pump casing. Two or more hex screws, hex socket screws, or studs with nuts are used for attaching the seal. The seal is typically radially positioned within the casing or within the cover of the casing by means of guidance between the casing or the cover of the casing and the body part of the seal and axially against the body part. The sealing water conduits required by the seal are generally positioned in a single acting seal in the casing or in the cover of the casing and in a double acting seal in connection with the body/end part of the seal.

The shaft seal has always a separate fastening flange or a gland for fastening screws, in a single acting seal as well as in a double acting seal, located outside the body or end part of the seal. If the pump casing or the cover of the casing is considered, a prior art slide ring seal requires in addition to a relatively complicated seal construction also at least two bores for the fastening screws of the seal. Such a structure is relatively complicated and thus also expensive.

The present invention tends to eliminate at least some of the problems of the prior art slide ring seals by tightening the seal directly to the casing of the pump or to the cover of the casing without a separate flange part by fastening means operating preferably in an inclined direction relative to the axis of the pump. By said fastening means, the seal is centered both radially against the guidance in the casing or in the cover of the casing and axially against a shoulder or like arranged in the cover of the casing or in the guidance of the casing or in connection with any of them. In this way a complicated, expensive and also unnecessary sealing gland is eliminated and moreover, the number of bores required in the casing or cover of the casing is decreased. Accordingly, the seal becomes simpler and easier to assemble.

Other typical features of a slide ring seal, flow machine, body part of said seal and a method of tightening said slide ring seal to said flow machine in accordance with the invention become evident in the accompanying claims.

Figure 2:
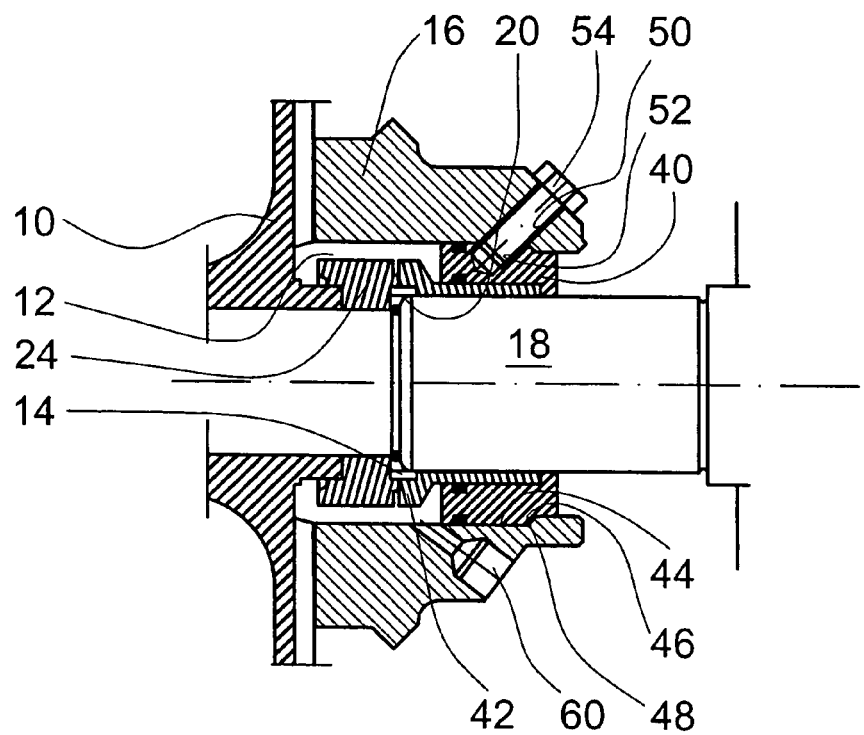
Figure 3:
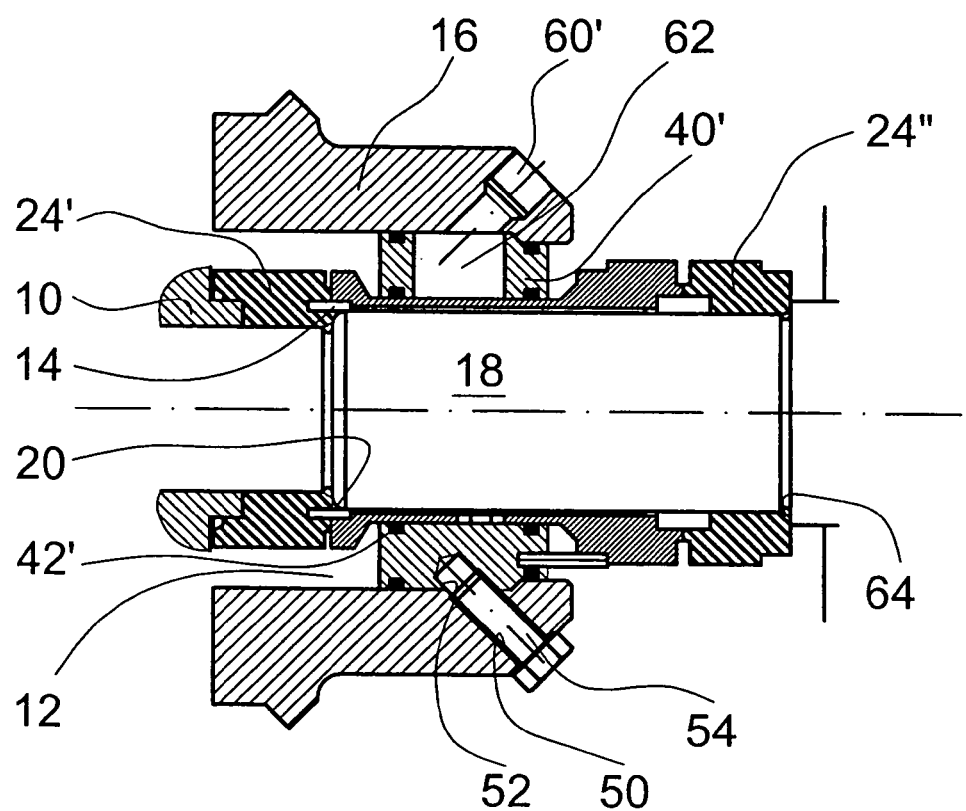

The slide ring seal, flow machine, body part of said seal and the method of tightening said slide ring seal to said flow machine are described more in detail below, with reference to the accompanying drawings, in which FIG. 1 illustrates a slide ring sealing in accordance with the prior art as a shaft sealing of a centrifugal pump;

FIG. 2 illustrates a slide ring seal in accordance with a preferred embodiment of the present invention, a so called single acting seal, as a shaft sealing of a centrifugal pump, too; and FIG. 3 illustrates a slide ring seal in accordance with another preferred embodiment of the present invention, a so called double acting seal, as a shaft sealing of a centrifugal pump as well.

FIG. 1 illustrates a prior art slide ring seal arrangement of a centrifugal pump, by means of which arrangement a pumping space 12 in the area of the impeller 10 of the centrifugal pump is separated from the shaft space 14 of the pump. The pumping space refers to all such space that is in a substantially open communication with the impeller 10. In other words, the pumping space 12 covers areas both in front of as well as behind the impeller 10. Exactly in the same way, the shaft space 14 refers to a space, which is in direct communication with the shaft of the pump. In this case, the shaft space 14 is located between the slide ring seal and the shaft 18. The seal arrangement naturally prevents also the leaking of the liquid to be pumped from the pumping space to the atmosphere from between the casing 16 and the sealing. In a schematically illustrated arrangement in accordance with FIG. 1, the mechanical seal comprises a rotary slide ring unit 24 positioned on the shaft 18 between the shoulder 20 of the shaft and the impeller 10, a non-rotary slide ring unit, i.e. a counter ring unit, which is shown as a full assembly 26 with the body part of the seal and a fastening ring 30. The actual slide rings are shown by reference number 28. The above description refers to slide ring units in general, because they are conventional technique and comprise a slide ring 28, a retainer ring, and possibly a spring device and/or a drive pin, O-ring, etc. Since the present invention does not profoundly relate to the inner structure of the slide ring unit, it is discussed more in detail neither here nor in connection with the actual invention. Moreover, the sealing comprises a number of O-rings 32 (shown in connection with a rotary slide ring unit, maybe found also in connection with the counter ring unit) or like seals and retaining pins in the holes in the non-rotary slide ring unit and in the body part, which pins are used for ensuring that the non-rotary slide ring unit, i.e. counterring unit is not able to rotate with the rotary slide ring unit 24. The seal also comprises a suitable spring device, by means of which a suitable pressure is ensured between the slide ring pair 28. Further, the sealing comprises liquid conduits 36 in the casing or in the cover of the casing 16. The actual attachment of the slide ring seal to the pump is carried out by axial bolts or studs 38 extending to the casing 16. Two or more bolts, studs or screws are required for one seal. These screws, or more accurately the space required for their opening, for their part, set requirements for the length of the pump.

FIG. 2 illustrates a so called single acting slide ring seal in accordance with a preferred embodiment of the invention, comprising much the same basic elements as the seal in accordance with the prior art. Same reference numbers are used for similar elements in both figures. However, if the description of the present invention is more profound than the description of the prior art, then new reference numbers will be used for the corresponding elements, too. Further, it must be noted that for simplicity, the following description discusses the casing of the flow machine, although the accurate term could as well be, for example, the cover of the casing or seal casing.

In other words, the slide ring sealing in accordance with FIG. 2 comprises, as for its rotary parts, a rotary slide ring unit 24 arranged between a shoulder 20 of a shaft 18 and an impeller 10. The simplified illustration of said slide ring unit in the figure comprises in reality also other elements, as is discussed already in the prior art section. The non-rotary parts of the slide ring sealing in accordance with the invention comprise a body part 40 of the seal, which is guided against the inner surface of the casing 16 and a non-rotary counterring unit 42, which is guided against the inner surface of the body part 40. Of course, in some cases, it is also possible that the non-rotary counterring unit is not a unit separate from the body part, but is integrated with the body part. Furthermore, the figure illustrates a number of conventional sealing rings (e.g. so called O-rings), by means of which, for example, the space between the casing 16 and the body part 40 as well as the space between the body part 40 and the counterring unit 42 are sealed.

The axial and radial guidance of the seal in accordance with the invention is carried out more precisely as follows. The substantially axial and cylindrical inner surface of the casing 16 operates at least substantially of the length, of which the body part 40 is in contact with it in operation, as guiding surface 44, against which the body part 40 is radially centered at a sufficient accuracy. Said guiding surface 44 terminates to a shoulder 46, where the radius of the inner surface of the casing 16 is reduced. In other words, at the shoulder 46 the inner surface 44 of the casing 16 converges, when going farther away from the impeller 10. A reduction in the radius of the body part 40 at a shoulder 48 corresponds to said shoulder 46, whereby the axial positioning takes place by means of said shoulders 46 and 48. The above described guiding is ensured by fastening or tightening the body part 40 to the casing 16 by suitable means so that the fastening means forces both guidances simultaneously against each other. Said fastening or tightening means is preferably a screw 54 tightened into an inclined threaded hole 52 in the body part 40 through an inclined hole 50 in the casing 16. Preferably, the screw 54 pulls the body part 40 against both the guiding surface 44 and the shoulder 46 of the casing 16.

It is characteristic of the slide ring sealing in accordance with a preferred embodiment of the invention illustrated in FIG. 2 to have a shoulder 48 and a threaded hole 52 in the body part 40 of the seal. It is characteristic of the shoulder 48 that by means thereof the seal is positioned axially. When this goal is studied, it is understood that it may be accomplished in addition to the illustrated conical shoulder, also by a radial shoulder or even so that the shoulder is replaced by an end surface of the body part, which takes its position against the corresponding surface of the casing or against the corresponding surface arranged in connection with the casing. However, the conical shoulder illustrated in the figure is still, in practice, the most preferred alternative. Another substantial element for the sealing in accordance with the invention is, as previously mentioned, the threaded hole 52 in the body part 40 of the seal, which is set in an inclined position compared to the axial and radial directions. The inclination of the threaded hole 52 relative to the direction of the axis of the body part is of the order 5-85 degrees, preferably 15-75 degrees. Mostly said threaded hole is located in a plane running along the axis of the body part, but it is, of course, possible that for some reason the hole is located in some other applicable plane. Thereby, the above mentioned inclination angle is determined by using a projection of the hole, and more accurately of the axis thereof, onto a plane running both parallel to the axis of the hole and along the axis of the body part.

According to a preferred embodiment of the invention, the direction of the threaded hole is perpendicular to the conical shoulder surface of the body part, whereby the fastening screw extending to the threaded hole through the hole in the casing pulls the shoulder of the body part against the corresponding shoulder of the casing in a perpendicular direction. It is substantial of the direction of the threaded hole 52 and the hole 50 in the casing 16 that when tightening the screw 54 the body part 40 of the seal tightens to its place both radially and axially.

FIG. 3 illustrates a so-called double acting slide ring seal in accordance with another embodiment of the invention. In fact, the structure of the seal is very similar to the single acting seal illustrated in FIG. 2. The question is, in fact, about adding another pair of slide rings as a mirror image of the first one to the right side of the seal of FIG. 2, i.e. to the side facing the pump bearings. In other words, in the embodiment in accordance with FIG. 3, a first rotary slide ring unit 24' is arranged between the shoulder 20 of the shaft 18 and the impeller 10, against which a non-rotary counter ring unit 42', when going towards the bearing assembly of the pump is located, which counter ring unit 42' is supported to the body part 40' guided against the inner surface of the seal casing. A second rotary slide ring unit 24" is located to the right of the body part 40 between the counter ring unit 42' and a second shoulder 64 on the shaft 18. In other words, on both ends of the non-rotary counterring unit 42 there is provided a slide ring. In a manner exactly corresponding to the embodiment of FIG. 2, the body part 40' is axially supported by its shoulder against the shoulder in the casing 16 and radially against the guiding surface of the casing. The body part is also similarly fastened by means of a screw arranged in an inclined position into a hole 50 in the casing and into a threaded hole in the body part 40'. Thus, the variations shown in connection with the single acting seal may also be applied in a double acting seal.

FIGS. 2 and 3 yet illustrate sealing water conduits, by which sealing water lubricating the seal surfaces is supplied to the slide rings. In FIG. 2, a sealing water conduit 60 is located in the casing 16 of the pump or in the cover thereof so that it brings the liquid to the space 12 between the seal and the casing, whereas in FIG. 3 a seal water conduit 60' brings the liquid through an opening 62 in the body part 40' of the seal via the channel arranged in the casing 16 to the space 14 between the seal and the shaft 18. Naturally, in the embodiments of both FIG. 2 and FIG. 3 there is also a second sealing water conduit, through which the liquid is removed from the space, where it is brought to.

In addition to the manners illustrated in FIGS. 2 and 3, where the seal may be installed and repaired at the end of the pump facing the impeller, it is possible to apply the embodiment in accordance with the invention also so that the seal may be assembled, removed or repaired at least partially at the end of the pump facing the bearing assembly. In fact, the only changes that need to be done are the following. First, a shoulder will be arranged to the casing or to the cover of the casing like the shoulder 48 in FIG. 2, but to the opposite side relative to the body part of the seal, i.e. between the body part and the impeller. The diameter of the casing or the cover of the casing in said shoulder is reduced towards the impeller so that the body part of the seal may be pushed against the shoulder to get the required axial support therefrom. The radial support is provided in the same way as in the previous embodiments along the guidance between the body part of the seal and the casing or the cover of the casing. Of course, it would be possible to provide this structure with an exactly similar inclined screw fastening as in the embodiments of FIGS. 2 and 3, but in practice it is difficult to implement due to a relatively small axial dimensions of the casing, since the screw should be tightened to the body part of the seal from the direction of the impeller.

In other words, the tightening of the body part of the seal against the guiding surfaces is in the above embodiment preferably done in a manner different from the embodiments of FIGS. 2 and 3. Because the body part must be pushed towards the impeller, for example, the tightening by a screw must be made in an opposite manner. In this embodiment of the invention, a the casing or the cover of the casing of the seal has been provided with a threaded hole into which a screw is tightened so that the screw pushes the body part of the seal towards the impeller, in other words against the above described shoulder of the casing or the cover of the casing. Simultaneously, the body part is also pushed by the screw against the inner guiding surface of the casing or the cover of the casing on the side of the body part opposite to the screw. It is typical of this embodiment that it is not necessary to provide a threaded hole in the body part, but only a mere blind hole, a recess, a substantially circumferential groove round the body part or a corresponding, but shorter groove is sufficient. It is thus a characteristic feature of said fastening means that it operates together with the preferably conical tip of the screw tightened to the threaded hole of the casing or the cover of the casing so that when tightening the screw deeper by means of said fastening means the screw tightens the body part both axially and radially. Moreover it is worth mentioning that the direction of the screw in the threaded hole of the casing or of the cover of the casing of the pump may be almost any including the direction of the radius, because, for example, by a screw with a radial direction and conical tip, it is also possible to carry out the inclined tightening of the body part of the seal. Even then, the conical tip of the screw or the tip of the screw shaped in some other suitable manner together with the side surface or side edge of the groove, recess or hole accomplishes the tightening of the body part both axially and radially.

As can be seen from the above description it has been possible to develop a slide ring sealing more simpler than the previous slide ring sealings. The slide ring sealing of the invention is also less expensive and requires less space than the previous arrangements. While the invention has been herein described by way of examples in connection with what are at present considered to be the preferred embodiments, it is to be understood that the invention is not limited to the disclosed embodiments, but is intended to cover various combinations and/or modifications of its features and other applications within the scope of the invention as defined in the appended claims. With regard to the appended claims it has to be understood that the claims use a word 'housing' by which all elements, parts, casings or casing covers, generally understood as points of application, to which the slide ring seal is to be fastened are covered.

The invention claimed is:

1. A body part of a slide ring seal for fastening said slide ring seal to a housing, said slide ring seal including a central axis and a non-rotary slide ring unit, wherein said body part including a threaded hole having an axis inclined with respect to the central axis of the slide ring seal for tightening the body part to the housing simultaneously in both axial and radial directions to fix the body part relative to the housing, the body part including a substantially cylindrical outer surface that interfaces with a substantially cylindrical inner surface of the housing to center the slide ring seal within the housing and a non-cylindrical outer surface that interfaces with a non-cylindrical surface of the housing, the non-cylindrical outer surface extending inwardly from the cylindrical outer surface toward the central axis.

2. The body part of claim 1, wherein the direction of the axis of said threaded hole is 5-85 degrees from the direction of the central axis of the slide ring seal.

3. The body part of claim 1, wherein the non-cylindrical outer surface of the body part is a shoulder or an end surface for axially supporting the body part to the housing.

4. A mechanical seal comprising the body part of claim 1 by which said seal is fastened to the housing, at least one rotary slide ring unit and at least one non-rotary countering unit, which is either separate from or in connection with said body part, wherein the body part is tightened to said housing both axially and radially by the threaded hole.

5. The mechanical seal of claim 4 comprising two pairs of slide rings and wherein the body part is provided with means for supplying sealing liquid to a shaft space and out of there.

6. The mechanical seal of claim 4 comprising a screw operating together with the hole for tightening the body part of the seal to the housing both axially and radially.

7. The body part of claim 1, wherein the position of the non-rotary slide ring unit is fixed relative to the body part.

8. A mechanical seal comprising a central axis, a body part by which said seal is fastened to a housing, at least one rotary slide ring unit, and at least one non-rotary countering unit, which is either separate from or in connection with said body part, wherein the body part is tightened to said housing both axially and radially to fix the body part relative to the housing by a hole being provided in said housing and having an axis inclined with respect to the central axis of the slide ring seal, the body part including a substantially cylindrical outer surface that interfaces with a substantially cylindrical inner surface of the housing to center the slide ring seal within the housing and a non-cylindrical outer surface that interfaces with a non-cylindrical surface of the housing, the non-cylindrical outer surface extending inwardly from the cylindrical outer surface toward the central axis.

9. The mechanical seal of claim 8, wherein the body part is provided with a threaded hole or a recess or a substantially circumferential groove or a blind hole for respectively tightening the body part to the housing.

10. The mechanical seal of claim 8, wherein the position of the non-rotary countering unit is fixed relative to the body part.

11. A body part of a slide ring seal, the body part including a non-rotary slide ring unit and means for tightening said body part to a housing to fix the body part relative to the housing, said body part being provided with inclined fastening means having an axis that is inclined with respect to a central axis of the slide ring seal, and the inclined fastening means being a threaded hole or a recess or a substantially circumferential groove or a blind hole in the body part, the body part including a substantially cylindrical outer surface that interfaces with a substantially cylindrical inner surface of the housing to center the slide ring within the housing and a non-cylindrical outer surface that interfaces with a non-cylindrical surface of the housing, the non-cylindrical outer surface extending inwardly from the cylindrical outer surface toward the central axis.

12. The body part of claim 11, wherein the position of the non-rotary slide ring unit is fixed relative to the body part.

13. The body part of claim 11, wherein the non-cylindrical outer surface of the body part is a shoulder or an end surface for axially supporting the body part to the housing.

* * * * *